US006301465B1

(12) United States Patent
Kintis et al.

(10) Patent No.: US 6,301,465 B1
(45) Date of Patent: Oct. 9, 2001

(54) ADAPTIVE TRANSCEIVER ARCHITECTURE FOR REAL TIME ALLOCATION OF COMMUNICATIONS RESOURCES IN A SATELLITE BASED TELECOMMUNICATION SYSTEM

(75) Inventors: Mark Kintis, Manhattan Beach; Eric R. Wiswell, Torrance; Mark K. Christopher, Redondo Beach; Konstantinos Makrygiannis, Torrance; Allen F. Conrad, West Hills; Harvey L. Berger; Ronald P. Smith, both of Redondo Beach; Daniel R. Lane, Santa Monica, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/169,883

(22) Filed: Oct. 12, 1998

(51) Int. Cl.$^7$ .................................................. H04B 7/185
(52) U.S. Cl. ..................... 455/12.1; 455/13.3; 455/226; 455/275
(58) Field of Search .................... 455/12.1, 13.1, 455/13.2, 13.3, 13.4, 427, 428, 429, 430, 226, 275; 370/316, 323, 325, 319

(56) References Cited

U.S. PATENT DOCUMENTS

| | | |
|---|---|---|
| 5,448,621 | 9/1995 | Knudsen . |
| 5,734,349 * | 3/1998 | Lenormand et al. ................ 342/373 |
| 5,745,846 * | 4/1998 | Myer et al. .......................... 455/209 |
| 5,889,494 * | 3/1999 | Reudink et al. ..................... 342/373 |
| 5,903,549 * | 5/1999 | von der Embse et al. .......... 370/310 |
| 5,924,031 * | 7/1999 | Copeland et al. ................... 455/428 |
| 5,929,804 * | 7/1999 | Jones et al. .......................... 342/354 |
| 5,936,588 * | 8/1999 | Rao et al. ............................ 343/754 |
| 5,956,620 * | 9/1999 | Lazaris-Brunner ................. 455/12.1 |
| 5,963,845 * | 10/1999 | Floury et al. ....................... 455/12.1 |
| 5,995,497 * | 11/1999 | Gerakoulis .......................... 370/320 |

* cited by examiner

Primary Examiner—Curtis Kuntz
Assistant Examiner—Barry W. Taylor
(74) Attorney, Agent, or Firm—Robert W. Keller

(57) ABSTRACT

An adaptive transceiver architecture which reallocates communications resources in real time based on the amount of bandwidth being used in communications channels in the system. The transceiver receives communications signals from a plurality of communications beam spots. Each communications beam spot has a predefined bandwidth divided into non-overlapping subbands. The transceiver further comprises a plurality of front end signal conditioners for receiving communications signals from an equal plurality of communications beam spots. A predetermined number of the conditioned signals are then combined by an interconnect. The interconnect receives composite signals from the front end signal conditioners, and it combines at least first and second communications signals from first and second respective composite signals to form an output processing signal. The first and second communications signals are received by the receiver from first and second communications beam spots, respectively, and the first and second composite signals are output from the first and second corresponding front end signal conditioners.

23 Claims, 3 Drawing Sheets

ADAPTIVE TRANSCEIVER ARCHITECTURE FOR REAL TIME ALLOCATION OF COMMUNICATIONS RESOURCES IN A SATELLITE BASED TELECOMMUNICATION SYSTEM

BACKGROUND OF THE INVENTION

The present invention relates to an architecture for a satellite transmitter/receiver subsystem in a satellite based telecommunications system. More specifically, the present invention relates to an adaptive transmit and receive architecture which reallocates communications resources in real time based on the amount of bandwidth being used by the system to support communications channels.

The Federal Communications Commission (FCC) has recently made available for commercial use certain bandwidth spectra in the 26 to 40 GHz frequency range. In response to the availability of this new high frequency range, several communications companies have bid for and obtained portions of this spectrum from the FCC to use in trying to develop systems of communicating through one or more satellites around the globe at very high data rates. Today, fast modems operate at a data transmission rate of 56 kilobits per second. The newly proposed satellite communications systems operating at frequencies between 26 to 40 GHz have data transmission rates on the order of 10 megabits per second or higher, approximately 200 times greater than the data transmission rate of today's fast modems.

These new satellite based telecommunications systems have been proposed to provide voice and/or date communications links between user terminals (mobile and fixed) and earth stations. The earth stations, in turn, connect the user terminals with remote originating/destination callers through public land mobile networks (PLMN), public switching telephone networks, other earth stations, other satellites, and the like. Each user terminal communicates with an assigned earth station along corresponding forward and return links which are supported by a satellite which has the user terminal and earth station in its field of view.

Each satellite includes at least one antenna which defines its earth coverage region or footprint. The satellite antenna (s) divide the coverage region into multiple beam spots. Each beam spot is assigned at least one frequency subband along which communications signals travel in the forward and return directions between user terminals and earth stations. Each subband may support communications from a plurality of user terminals. The user terminals are assigned unique transmission channels or "circuits" within an associated subband. A channel or "circuit" represents a unique path along which the corresponding user terminal transmits and receives radio frequency (RF) signals containing discrete frames or packets of communications data and/or command information. A channel or circuit may be defined in a variety of ways, depending upon the system's coding technique, such as time division multiple access (TDMA), frequency division multiple access (FDMA), code division multiple access (CDMA) or any combination thereof.

FIG. 1 generally illustrates a block diagram of a conventional receiver architecture of a telecommunications satellite. The receiver architecture includes an uplink antenna 1 with N beams 3 corresponding to N respective geographic supercells. Each beam 3 is divided into a predetermined number of subbands 5. The subbands 5 have been numbered from SB# 1 to SB# 553. In the example of FIG. 1, each beam 3 includes seven subbands 5. For purposes of illustration only, it is assumed that each beam 3 is divided into seven subbands 5 each of which corresponds to a unique carrier frequency.

Each user terminal is assigned to one variable output broadcast matrix 7 that corresponds to one beam. There are N variable output broadcast matrices 7 contained in the receiver architecture of FIG. 1 (e.g., in the uplink structure) corresponding to the N beams into which the overall footprint of the satellite is divided. Each beam 3 of the satellite's uplink antenna is divided into seven subbands 5 and therefore in the examples of FIG. 1, a 7×7 output broadcast matrix 7 is used. That is, the variable output broadcast matrix 7 can have up to seven inputs and seven outputs. Thus each variable output broadcast matrix 7 can handle communications signals from user terminals in up to seven subbands. The N variable output broadcast matrices 7 are connected to RF downconverters 9 (e.g., LO1–LO7). Each downconverter 9 processes seven subbands associated with the beam corresponding to that 7×7 broadcast matrix 7. Within one given broadcast matrix 7, each user terminal is allocated an amount of frequency bandwidth based either on a peak (or full) bandwidth capacity, or on a "butter-spread" capacity.

Where the frequency bandwidth is allocated using peak capacity, one channel for one user terminal will occupy all seven subbands within the beam 3. A single channel may be defined in terms of a single chip code and time slot for a system using both CDMA and TDMA techniques. Thus, a single channel may use the seven subbands 5 being fed into a broadcast matrix 7 to form a single communications signal from one user terminal. Once this signal is fed into the broadcast matrix 7, the matrix allocates a portion of the signal to each of the seven variable local oscillators (LO1–L07) or downconverters 9 at the output of the matrix 7. The LO1–L07 downconverters 9 mix the input signal to a corresponding predetermined carrier frequency. The mixed output signals of the downconverters 9 are then filtered by a bandpass filter 11, summed by a seven-way summer 15, and then processed by the analog to digital (A–D) converter 17 dedicated to the particular beam through which the communications signal was received.

When the bandwidth is allocated in an "butter-spreading" manner, each channel, and thus each user terminal, occupies a single subband 5 within the beam 3. After each of the seven signals are fed into the broadcast matrix 7, the broadcast matrix 7 passes the seven signals to their corresponding downconverters 9 at the output of the matrix 7. The downconverters 9 mix corresponding input signals to a predetermined carrier frequency. The outputs of the downconverters 9 are then individually filtered by a respective bandpass filter 11, summed by a seven-way summer 15, and then processed by the analog to digital (A–D) converter 17 which is dedicated to the particular beam by which the user terminals' signals are received.

In order for satellite based telecommunications systems to operate, each satellite in the system must contain sufficient processing hardware to accommodate the maximum amount of information being transferred at any instant in time. Heretofore, conventional systems required that each satellite contain a separate processing unit or hardware subsystem for each beam of the satellite. For example, a satellite with 100 beams must contain 100 separate, individual processing units. As satellites move across regions of the earth that differ in population density, the demands of any given satellite greatly fluctuate.

Various factors affect the congestion of users in each beam spot at any given moment in time. Accordingly, a system requiring a separate processing unit for each individual beam is extremely inefficient when several beam spots are supporting little or no communications channels. For example, as the time of day changes, the number of active users in a given beam spot or footprint rapidly changes. At 8:00 AM in New York City, the number of users in that geographical area is high, while at the same time, it is 5:00 AM in Los Angeles and thus the user activity and, more generally, the user population in that area is likely to be quite low. Similarly, at 5:00 PM in Los Angeles, the number of active users is likely to be much higher in L.A. than in New York City, where it is 8:00 PM. Prior art systems have addressed the foregoing issue in one of two ways. One approach has been to determine before the fact the most efficient use and allocation of processing hardware. A second approach has been to assume maximum demand 100% of the time and provide sufficient hardware in every satellite to handle the demand. In the former situation, satellites are designed to provide much lower processing capabilities for beamspots which cover areas with few user terminals. In other words, satellites and/or beam spots that are expected to cover less populated areas (or areas that are projected to have few users) are built with limited transmitter/receiver hardware resources. However, a given satellite will be used for many years. Thus, the potential exists for change in the geographic population. Satellites of the former design cannot account for increases in demand or in population. Thus if, for example, the future population is underestimated for a given area, the resulting lack of communication capacity would be very expensive in the long run since a new satellite would be required.

On the other hand, in the latter situation, each satellite contains sufficient hardware to provide the maximum amount of processing capability for every one of that satellite's beam spots. A beam spots compability would then only be limited by the available bandwidth and channels capable of being supported by the available bandwidth. Thus, a beam spot that covers Chicago will have the same amount of channel or circuit capacity as a beam spot that covers central Africa. This is a very inefficient use of resources. Further, the extra hardware required to support the maximum number of channels would require a heavier launch vehicle, create unnecessary complexity, and require a greater amount of power consumption. The power consumption would be larger because a processor for any given beam must operate at full capacity regardless of whether one or one-thousand user terminals are communicating within that beam spot coverage area. This results in an extremely inefficient use not only of processing resources, but of power consumption as well.

As explained above, the foregoing telecommunications satellite transceiver structure has met with limited success, as the transmitter/receiver hardware is unduly complex and/or inefficient. A need remains for an improved satellite transmitter/receiver architecture (hereafter transceiver).

OBJECTS OF THE INVENTION

It is an object of the present invention to maximize the overall efficiency of a satellite telecommunication system.

It is a further object of the present invention to minimize the amount of transceiver and digital hardware necessary for each satellite in a satellite based telecommunication system to process all signals within its coverage area.

It is a further object of the present invention to minimize the amount of power consumed by each satellite in a satellite based telecommunication system.

It is a further object of the present invention to minimize the number of digital processors being user by a given satellite at any moment in time.

It is a further object of the present invention to minimize the total number of digital processors built into the hardware of a satellite. It is a further object of the present invention to minimize the complexity of the processing hardware used in a satellite based telecommunication system.

It is a further object of the present invention to minimize the weight of each satellite used in a satellite based telecommunication system.

It is a further object of the present invention to provide a system capable of reallocating digital processing resources of a satellite telecommunication system based on the number of users operating within the system at any given time.

These and other objects are achieved by a transceiver subsystem for a telecommunications satellite which includes an interconnect that, in the receiver structure, combines communications signals so that more than one signal may be processed by a single digital processor, and in the transmitter structure, allows a single wideband modulator to be used to code signals to be transmitted to multiple destinations.

DETAILED DESCRIPTION OF THE PREFERRED EMBODIMENTS

As explained above, the present invention relates to an adaptive transmit and receive architecture which reallocates communications resources in real time based on the amount of bandwidth being used by the system. An example of when communications resources may be reallocated due to changes in bandwidth is when the number of active users in a given beam spot rapidly changes as the time of day changes. More specifically, as illustrated above, when it is 8:00 AM in New York City, the number of users in that area is high, while at the same time, it is 5:00 AM in Los Angeles and thus the user activity and, more generally, the user population in that area is likely to be quite low. Similarly, at 5:00 PM in Los Angeles, the number of active users is likely to be much higher in L.A. than in New York City, where it is 8:00 PM.

Figure 1:
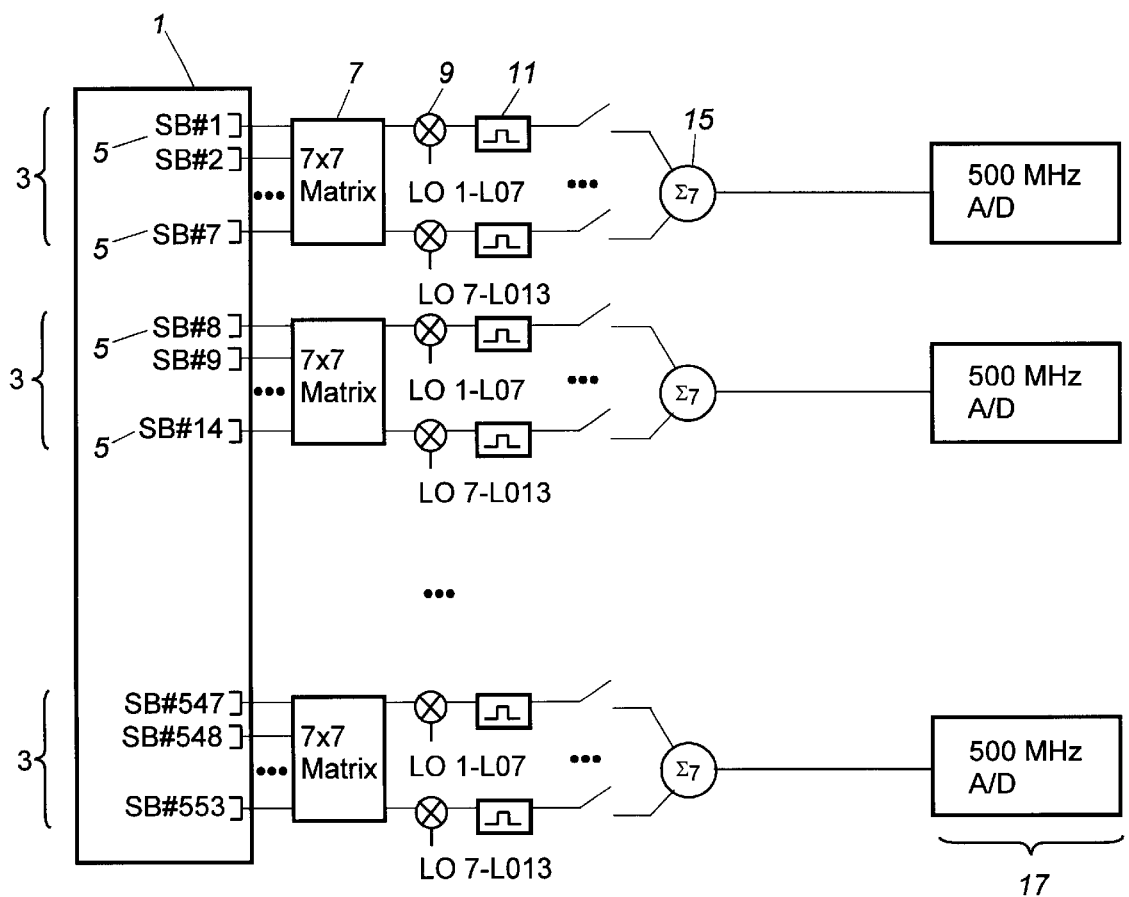
FIG. 1 illustrates a block diagram of a conventional uplink receiver architecture of a telecommunications satellite.
Figure 2:
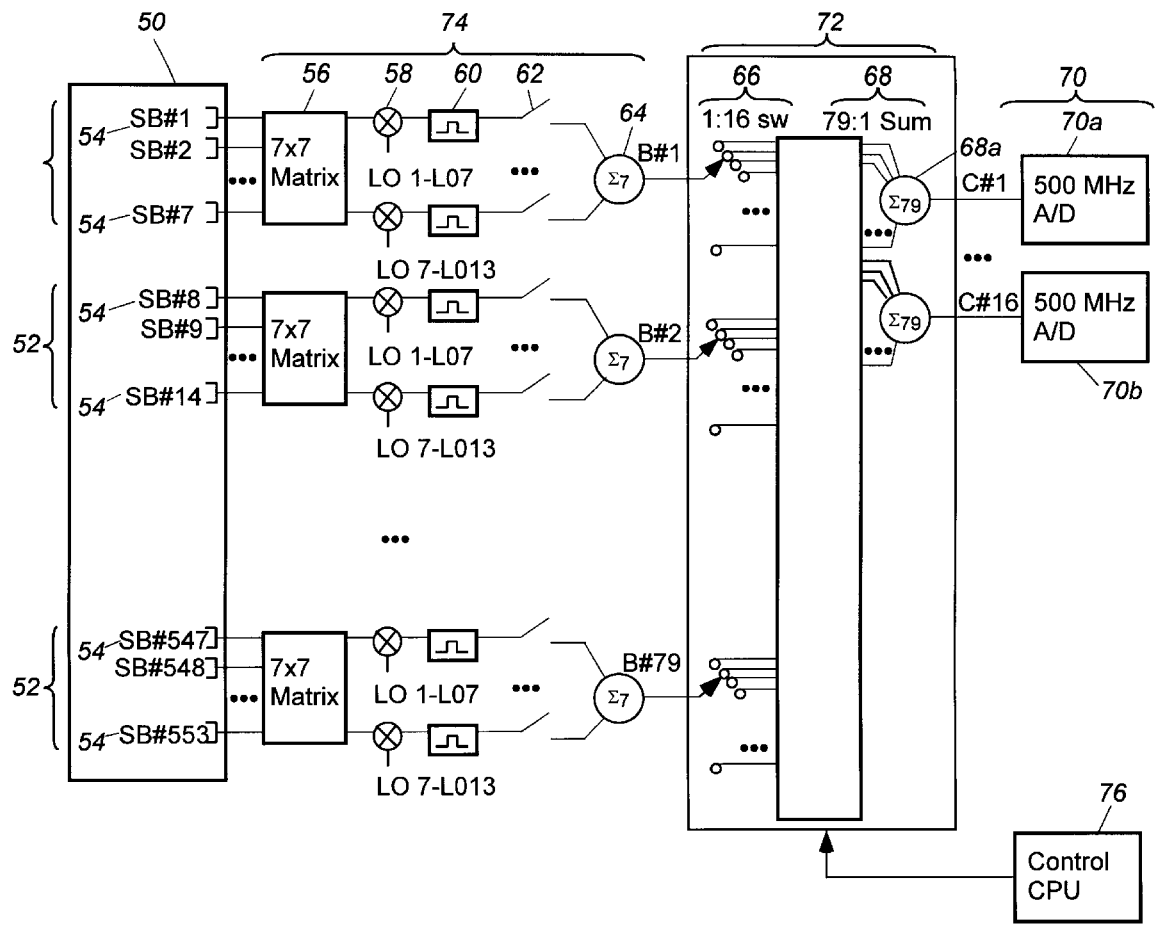
FIG. 2 illustrates a block diagram of an adaptive uplink receiver architecture of a telecommunication satellite in accordance with a preferred embodiment of the present invention.

FIG. 2 illustrates a block diagram of an adaptive uplink receiver architecture of a telecommunications satellite. The receiver includes an antenna 50 for receiving communications signals from user terminals and earth stations (not shown). The communications signals pass from the antenna 50 to a front end signal conditioner 74 which conditions the received signals for digital processing to form a composite communications signal. The composite signals are output to an adaptive interconnect 72.

Similar to conventional systems, each user terminal within a geographic supercell communicates over a particular subband 54, each subband 54 carrying communications signals. Further, each subband 54 is associated with a variable output broadcast matrix 56 that corresponds to one beam 52. The components of the front end signal conditioner 74 are also similar to conventional receiver structures, including broadcast matrices 56, down converters 58, fitters 60, switches 62 and summers 64. If N beams 52 are associated with a given satellite, there will be N corresponding variable output broadcast matrices 56 contained in the transceiver uplink structure. Any value for N may be used for the present invention. However, in accordance with the preferred embodiment, it is assumed that there are seventy-nine beams 52 in the satellite's uplink antenna, and each of these beams 52 is divided into seven subbands 54. Because the preferred embodiment assumes seven subbands per beam, a 7×7 output broadcast matrix 56 is accordingly used. Therefore, each broadcast matrix 56 can handle communications signals from user terminals in a maximum of seven subbands. The seventy-nine variable output broadcast matrices 56 are connected to seven RF downconverters 58 (i.e., LO1–LO7), and each down converter 58 corresponds to one of the seven subbands 54. Within one broadcast matrix 56, each user terminal is allocated a frequency bandwidth based either on a peak (or full bandwidth) capacity, or on a butter-spread capacity as explained above.

In the embodiment of FIG. 2, the downconverted signals from the front end signal conditioner 74 are transmitted to the interconnect 72. In the interconnect 72, the signals are passed to N 1:n switches 66. The value for n may correspond to the minimum number of A–D converters 70 necessary to allow a satellite to operate at maximum capacity. Thus, n may be determined by the bandwidth capacity of the individual A–D converters 70, and the overall communication capacity of the satellite. For example, in a situation where the A–D converters 70 are able to process signals within a 500 MHz bandwidth, and the satellite is able to handle 8000 MHz of bandwidth, then the satellite must have sixteen A–D C# 1–C# 16 converters 70 in order to be able to operate at maximum capacity. Thus, n would equal sixteen. Throughout the remainder of this specification, it is assumed that a 1:16 switch is used for the purpose of illustration.

The 1:n switches 66 direct the communications signals to one of n N:1 summers 68 with which the 1:n switches 66 are interconnected. The signals are directed to one of the n N:1 summers 68 in a predetermined manner explained below. As explained above, N is the number of beams into which the footprint of the satellite is divided. For the purpose of illustration throughout the remainder of this specification, it is assumed that seventy-nine beams B#1–B#79 exist within the footprint of any given satellite (i.e, N=79), and thus the 1:16 switch 66 is interconnected with a 79:1 summer 68.

The combination of the plurality of 1:n switches 66 interconnected with the plurality of N:1 summers 68 is referred to hereinafter as the interconnect 72. The general purpose of this unique component of the present invention is to allow the receiver to fill up the capacity of a first digital processor 70a before utilizing a second processor 70b. For example, assuming in a system using 500 MHz processors, a first beam 52 is receiving 100 MHz of communications signals, a second beam 52 is receiving 150 MHz of communications signals and a third beam 52 is receiving 200 MHz of communications signals. Thus, the total bandwidth being used within these three beams 52 is 450 MHz. In a system not employing an interconnect 72 as in the present invention, three 500 MHz processors, having a cumulative capacity of 1500 MHz, would be necessary in order to process the 450 MHz bandwidth currently being communicated over the three beams. However, in a system utilizing an interconnect 72, as in the present invention, the interconnect 72 may direct the signals from each of the three beams into a single 500 MHz processor. The interconnect 72 routes signals to a single processor 70a or 70b by using the 1:16 switches 66 corresponding to the first, second and third beams to direct the respective communications signals to the inputs of the same 79:1 summer 68a. The 79:1 summer 68a then combines the three signals and directs them to a common processor 70a. The switching controls of the interconnect 72 are accomplished by a microprocessor 76 receiving appropriate control commands from either a local or global ground station.

Finally, the processor 70a or 70b which processes the original signals transmitted by each of the user terminals within the satellite's coverage area. The A/D converters 70 form converted digital signals which are subsequently demodulated, sent to a router and then transmitted to the predetermined destination.

Figure 3:
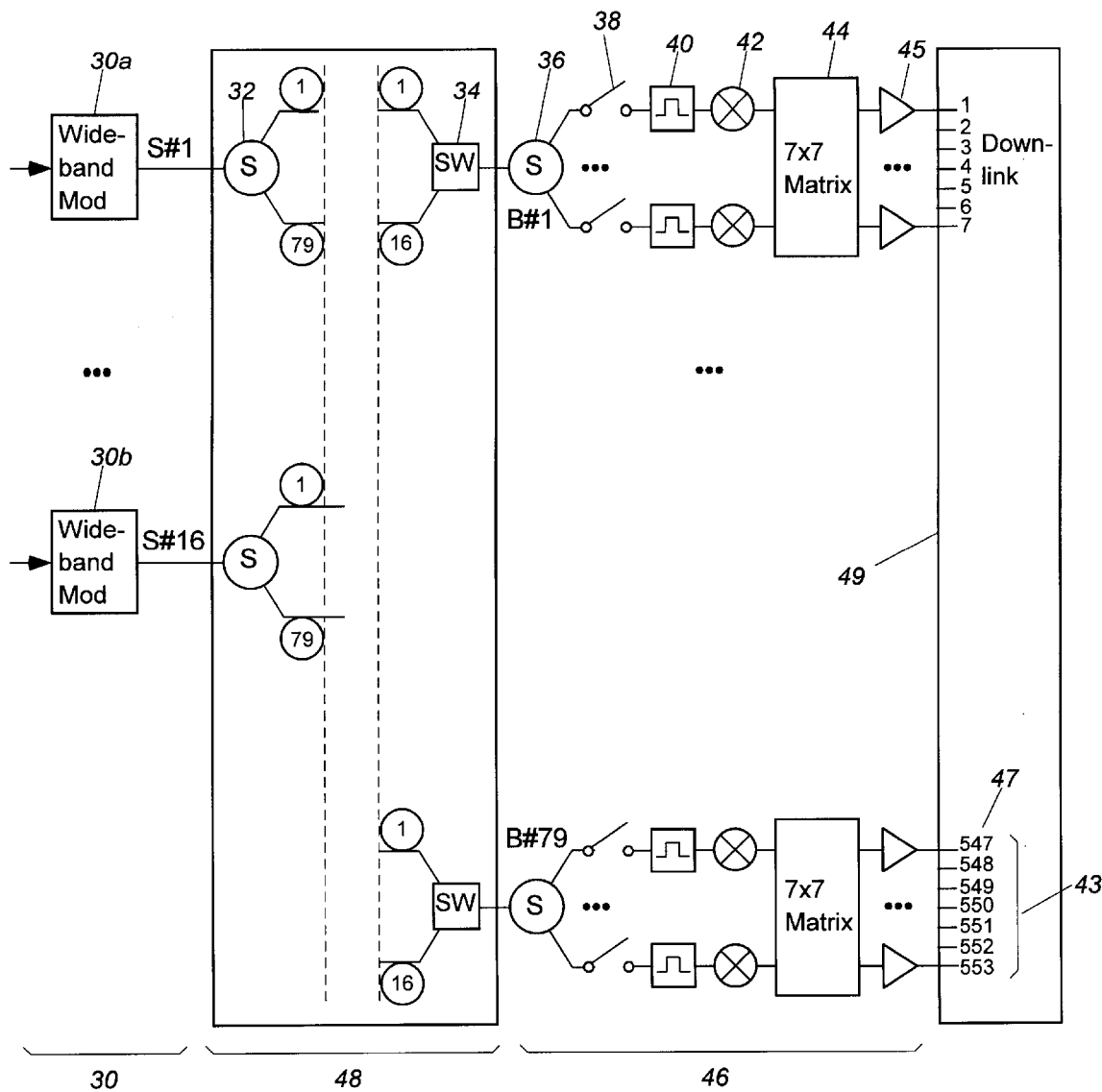
FIG. 3 illustrates a block diagram of an adaptive downlink transmitter architecture of a telecommunication satellite in accordance with a preferred embodiment of the present invention.

FIG. 3 illustrates a block diagram of an adaptive transmitter architecture of one satellite in a satellite based telecommunication system in accordance with the present invention. The transmitter architecture includes n wideband modulators 30, from which the modulated signals S# 1–S# 16 pass through an interconnect 48 to one of N back end signal conditioners 46. The signals S# 1–S# 16 are then transmitted to a predetermined destination. The operation of the transmitter architecture is discussed in more detail below.

In the transmitter architecture, all digital communications data to be transmitted will be fed into one of n preassigned wideband digital modulators 30, where the digital communications data will be converted to an appropriate processed frequency, forming modulated signals. Similar to the receiver structure, the value for n corresponds to the minimum number of wideband digital modulators necessary to allow a satellite to operate at maximum capacity. Thus, in a situation where the wideband digital modulators 30 are able to convert up to 500 MHz of bandwidth to the appropriate processed frequency, and the satellite is able to handle 8000 MHz of bandwidth, then the satellite may have 16 wideband digital modulators 30 in order to be able to operate at maximum capacity. Thus, n would equal 16. In general, the value for n in a receiver will equal the value for n of a transmitter. A 1:16 switch is assumed for the purpose of illustration.

After modulation, the n modulated signals at the outputs of the n respective wideband digital modulators 30 are fed into an interconnect 48. The interconnect 48 includes n 1:N splitters 32 and N switches 34. As with the receive structure in FIG. 2, N is assumed to be seventy-nine for purposes of illustration. Each of the n splitters 32 power divides its respective modulated signal, resulting in N reduced amplitude signals at the outputs of each splitter 32. These reduced amplitude signals are then directed to any one of N 1:n switches 34. Any of these N switches included in the interconnect 48 may combine more than one power divided signal to form a transfer signal. The purpose of the interconnect 48 is to allow the transmitter to use each wideband digital modulator 30 to modulate more than one communications signal.

From the output of the N switches, the N resulting multiplexed output signals are conditioned by a corresponding back end signal conditioner 46. The first step in the signal conditioning process of the multiplexed signals at the outputs of the N switches is to power divide each of these signals by a back end splitter 36. The transmitter architecture may comprise N back end splitters 36. In the preferred embodiment of this invention, each of the N back end splitters 36 may divide its corresponding input into seven reduced amplitude communications signals. These seven signals at the outputs of each back end splitter 36 correspond to seven non-overlapping subbands 47 which make up one associated beam 43.

The reduced amplitude signals at the 7 outputs of the back end splitters 36 then pass through a corresponding switch 38 before passing through a band-pass filter 40. The switches 38 in the back end signal conditioners 46 are either open or closed depending on whether the corresponding output of the splitter 36 feeding into the particular switch 38 contains data.

After being filtered by the band-pass filters 40, the filtered signals are upconverted by a corresponding variable upconverter 42 to a predetermined carrier frequency. Similar to the switches 38 and filters 40, there are seven variable upconverters 42 within each back end signal conditioner 46, each upconverter 42 corresponding to an individual subband 47 within an associated beam 43.

Once converted to their predetermined carrier frequencies, the communications signals are multiplexed by an associated broadcast matrix 44 (similar to the broadcast matrices of the receive architecture). As in the receive architecture, there are N broadcast matrices 44 (one for every back end signal conditioner 46 corresponding to a beam 43), and these broadcast matrices 44 are able to handle seven inputs and seven outputs according to the preferred embodiment. As already discussed with the receiver architecture of the present invention, the number of inputs and outputs to each broadcast matrix 44 depends on whether the frequency bandwidth is allocated using a peak capacity or butter-spread capacity scheme.

When the frequency bandwidth is allocated using peak capacity, one user terminal will occupy all seven subbands 47 within the beam 43. Thus, of the potential outputs from the broadcast matrix 44, only one such output will contain a signal to be transmitted to a user terminal. Thus, the broadcast matrix 44 takes the portion of this single output that is initially allocated to each of the seven inputs and combines them to form a single output.

When the frequency bandwidth is allocated in a butter-spreading manner, each of the seven user terminals occupies a single subband 47 within the associated beam 43. Thus, each of the converted signals at the outputs of the variable upconverters 42 corresponds to one subband of the transmitting bandwidth of the associated beam.

Finally, the signals at the outputs of the broadcast matrices 44 are passed through corresponding power amplifiers 45 and then transmitted to their predetermined destination locations by the downlink antenna 49 of the satellite.

While particular elements, embodiments and applications of the present invention have been shown and described, it will be understood, of course, that the invention is not limited thereto since modifications may be made by those skilled in the part, particularly in light of the foregoing teachings. It is, therefore, contemplated by the appended claims to cover such modifications as incorporate those features which come within the spirit and scope of the invention.

We claim:

1. A transceiver subsystem for a telecommunications satellite, comprising:

an antenna for transmitting and receiving communications signals over a plurality of communications beam spots, each communications beam spot having a pre-defined bandwidth assigned thereto, said bandwidth being divided into non-overlapping subbands;

a plurality of front end signal conditioners conditioning communications signals received from an equal plurality of communications beam spots to output associated composite signals;

multiple A/D processors processing said communications signals; and an interconnect disposed between said front end signal conditioners and said A/D processors, said interconnect directing first and second communications signals from first and second respective beam spots to a single A/D processor, said interconnect including a plurality of summers, each summer including a plurality of inputs equal to the number of communications beam spots, said interconnect including a plurality of switches directing each complete communications beam spot in a one to one relation to a single summer input.

2. The system according to claim 1, wherein each of said front end signal conditioners further comprises a plurality of downconverters, each downconverter reducing the frequency of the input signal of a corresponding subband from a carrier frequency to a predetermined processing frequency.

3. The system according to claim 1, wherein each of said front end signal conditioners further comprises a plurality of band-pass filters, each band-pass filter passing said predetermined processing frequency corresponding to one subband.

4. The system according to claim 1, wherein each of said front end signal conditioners further comprises a plurality of switches, each of said switches selecting a corresponding communications signal received over a subband associated with a corresponding one of said front end signal conditioners.

5. The system according to claim 1, wherein a first front end signal conditioner further comprises a corresponding front end summer to combine at least two communications signals from corresponding subbands associated with a first communications beam spot, to form a corresponding first composite signal.

6. The system according to claim 1, wherein said interconnect further comprises first and second input switches for directing first and second composite signals, respectively, from first and second front end signal conditioners to first and second predetermined switch outputs.

7. The system according to claim 1, wherein said interconnect further comprises a first summer for summing first and second communications signals from first and second front end signal conditioners, respectively, to form a single output processing signal directed to a single A/D processor.

8. The system according to claim 1, wherein said interconnect further comprises first, second, third and fourth input switches for directing said first, second, third and fourth composite signals respectively, from said first, second, third and fourth front end signal conditioners to less than four A/D processors.

9. The system according to claim 8, wherein said interconnect further comprises a first summer for summing outputs of said first, second, third and fourth input switches to form a single input to a common A/D processor.

10. The system according to claim 8, wherein said interconnect further comprises:

a first summer for summing outputs of said first and second input switches corresponding to said first and second front end signal conditioners to form a first output processing signal directed to a first A/D processor; and a second summer for summing outputs of said third and fourth input switches corresponding to said third and fourth front end signal conditioners to form a second output processing signal directed to a second A/D processor.

11. The system according to claim 1, wherein one communications signals from a first front end signal conditioner, from a corresponding subband associated with a first communications beam spot, forms a corresponding first composite signal.

12. The system according to claim 11, wherein a second front end signal conditioner further comprises a corresponding front end summer to combine at least two communications signals from two corresponding subbands associated with a second communications beam spot, to form a corresponding second composite signal.

13. The system according to claim 12, wherein a third front end signal conditioner further comprises a corresponding front end summer to combine at least two communications signals from corresponding subbands associated with a third communications beam spot, to form a corresponding third composite signal.

14. The system according to claim 1, wherein said interconnect further comprises first, second and third input switches for directing communications signals from first, second and third beam spots to a common A/D processor.

15. The system according to claim 14, wherein said interconnect further comprises:
a first summer for summing said first and second predetermined outputs corresponding to said first and second front end signal conditioners via said first and second corresponding input switches to form a first output processing signal; and
a second summer for passing said third predetermined output corresponding to said third front end signal conditioner via said third corresponding input switch to form a second output processing signal.

16. A transmitter subsystem for a telecommunications satellite, comprising:
a plurality of wideband modulators for modulating corresponding digital communications data onto a predetermined processed frequency, forming processed signals;
an interconnect, receiving said processed signals from said plurality of wideband modulators, for distributing said processed signals among a plurality of communications beam spots via a plurality of back end signal conditioners to form transfer signals, said interconnect including a plurality of splitters equal to the number of wide band modulators, each splitter including a plurality of outputs equal to the number of communications beam spots, said interconnect including a plurality of switches directing each summer output to a single communications beam spot, each complete communications beam spot being carried over a single splitter output; and
a transmitter for transmitting said transfer signals over said plurality of communications beam spots to predetermined destinations.

17. The system according to claim 16, wherein said interconnect comprises a plurality of input splitters, each of said input splitters corresponding to one wideband modulator, said input splitters splitting each of said processed signal into a predetermined number of power divided signals.

18. The system according to claim 17, wherein said interconnect further comprises at least one switch for combining more than one of said power divided signals to form at least one of said transfer signals.

19. The system according to claim 16, wherein each of said back end signal conditioners further comprises a back end splitter for splitting each of said transfer signals into at least one communications signal.

20. The system according to claim 19, wherein each of said back end signal conditioners further comprises a plurality of band-pass filters, each band-pass filter passing one of said communications signals.

21. The system according to claim 20, wherein each of said back end signal conditioners further comprises a plurality of upconverters, each upconverter corresponding to one subband, and each upconverter increasing the frequency of each of said communications signals from a processing frequency to a carrier frequency.

22. The system according to claim 21, wherein each of said back end signal conditioners further comprises a broadcast matrix for converting said communications signals into a transfer signal, each communications signal corresponding to one subband.

23. The system according to claim 22, wherein each of said back end signal conditioners further comprises a plurality of power amplifiers, each power amplifier corresponding to one subband, and each power amplifier amplifying a corresponding transfer signal before transmitting said transfer signals over said plurality of communications beam spots to predetermined destinations.

* * * * *